(12) United States Patent
Riekse

(10) Patent No.: US 6,290,280 B1
(45) Date of Patent: Sep. 18, 2001

(54) AUXILIARY SUN VISOR FOR A MOTOR HOME

(76) Inventor: Neil B. Riekse, P.O. Box 109, Orange, CA (US) 92868

( * ) Notice: Subject to any disclaimer, the term of this patent is extended or adjusted under 35 U.S.C. 154(b) by 0 days.

(21) Appl. No.: 09/575,521

(22) Filed: May 23, 2000

(51) Int. Cl.⁷ .................................................. B60J 3/00
(52) U.S. Cl. ........................................ 296/97.6; 296/97.9
(58) Field of Search ................................. 296/97.6, 97.5, 296/97.9, 97.12, 97.2

(56) References Cited

U.S. PATENT DOCUMENTS

| | | | |
|---|---|---|---|
| 2,220,429 | * | 11/1940 | Soderburg . |
| 2,878,174 | * | 3/1959 | Van Denburg . |
| 4,195,876 | * | 4/1980 | Timperio . |
| 4,666,205 | * | 5/1987 | Nakagawa . |
| 5,649,736 | * | 7/1997 | Jackson . |

* cited by examiner

Primary Examiner—Stephen T. Gordon
Assistant Examiner—Scott Carpenter
(74) Attorney, Agent, or Firm—Morland C. Fischer

(57) ABSTRACT

An auxiliary sun visor for a recreational vehicle (e.g. a motor home) to be used in combination with but not in substitution of the conventional factory installed sun visor. The auxiliary sun visor is adapted to be rotated relative to the factory installed sun visor from an at rest position behind the front window of the motor home to a deployed position adjacent the side window of the motor home to block the transmission of sunshine and glare through the side window. The auxiliary sun visor is detachably and rotatably coupled by a bracket to the existing support arm that connects the factory installed sun visor to the motor home.

2 Claims, 4 Drawing Sheets

AUXILIARY SUN VISOR FOR A MOTOR HOME

BACKGROUND OF THE INVENTION

1. Field of the Invention

This invention relates to an auxiliary sun visor for a recreational vehicle (e.g. a motor home) which is detachably coupled to the factory installed sun visor. The auxiliary sun visor is rotatable relative to the factory installed sun visor to a deployed position along the side window of the motor home to block the transmission of sunshine and glare therethrough.

2. Background Art

Drivers of recreational vehicles and passenger vehicles share a common problem when driving in conditions of bright sunlight and/or where the sun is low on the horizon. That is to say, both the driver and his passenger may be temporarily blinded as a consequence of sunlight and glare which passes through the front and side windows of the vehicle. The typical passenger vehicle is provided with a sun visor that can be rotated between the front and side windows to provide a comfortable driving condition depending upon the location of the sun in the sky and the direction in which the passenger vehicle is traveling relative to the sun.

However, in the case of large recreational vehicles, such as a motor home, the factory installed sun visors are not adapted to be rotated from the front to the side window. Because of their relatively large size and weight, the conventional sun visor that is associated with a motor home is held in place by means of an existing support arm structure that permits the factory installed sun visor to be rotated between a downward, sun blocking position behind the front window and an upward, stowed away position above the front window. Consequently, the driver and passenger within a motor home have no simple and reliable means to shade their eyes in the event that sunlight enters the vehicle through a side window. Such a situation can negatively impact the comfort of the occupants and present a dangerous driving condition as well.

Accordingly, what is needed is an easy to use, simply to install means that is detachably coupled inside the driver and passenger compartments of a recreational vehicle to be selectively deployed by the occupants to prevent unwanted sunlight and glare from entering the recreational vehicle from the side windows thereof.

SUMMARY OF THE INVENTION

An auxiliary sun visor is disclosed having particular application for use in a recreational vehicle such as a motor home, or the like. The auxiliary sun visor is used in combination with and not as a replacement for the factory installed sun visor to enable both the driver and a passenger to block the transmission of sunlight and glare through the front and side windows of the motor home. The factory installed sun visor is suspended from a pair of existing support arms that extend outwardly from opposite ends thereof to be pivotally connected to respective receptacles at the roof of the motor home. Thus, the factory installed sun visor is capable of being rotated from a downward position at which to block the transmission of sunlight through the front window of the motor home to an upward, stowed away position above the front window. The auxiliary sun visor of this invention is coupled to one of the existing support arms of the factory installed sun visor so as to be adapted to rotate with the factory installed sun visor between its downward, sun blocking position and its upward, stowed away position. What is more, the auxiliary sun visor is also adapted to rotate independently of the factory installed sun visor to a deployed position along a side window of the motor home so that the occupants of the motor home can be advantageously shielded from unwanted sunlight through both the front and side windows.

The auxiliary sun visor includes a flat panel that is formed from a transparent plastic material that may be tinted or smoked to reduce the transmission of sunlight. Channel members run along the top and outside edges of the panel, and a bracket is affixed to the panel through the intersection of the top and side channel members. The bracket includes upper and lower plates having opposing clamping receptacles within which to receive the existing support arm of the factory installed sun visor. A rotatable locking knob carried by the upper bracket plate has a threaded shaft to be mated to a correspondingly threaded lug that is integral to the lower bracket plate.

When the locking knob is rotated in a first direction, the threaded shaft thereof is removed from its threaded lug so that the upper and lower plates of the bracket can be separated from one another to enable the existing support arm to be seated within the opposing clamping receptacles. When the locking knob is rotated in an opposite direction, the threaded shaft thereof is moved into mating engagement with its threaded lug, whereby the upper and lower plates of the bracket are tightened together to apply a clamping force against the existing support arm of the factory installed sun visor, whereby the auxiliary sun visor is now detachably coupled to the factory installed sun visor to be moved with or independently thereof depending upon the location of the sun in the sky and the direction in which the motor home is traveling.

DETAILED DESCRIPTION

Figure 1:
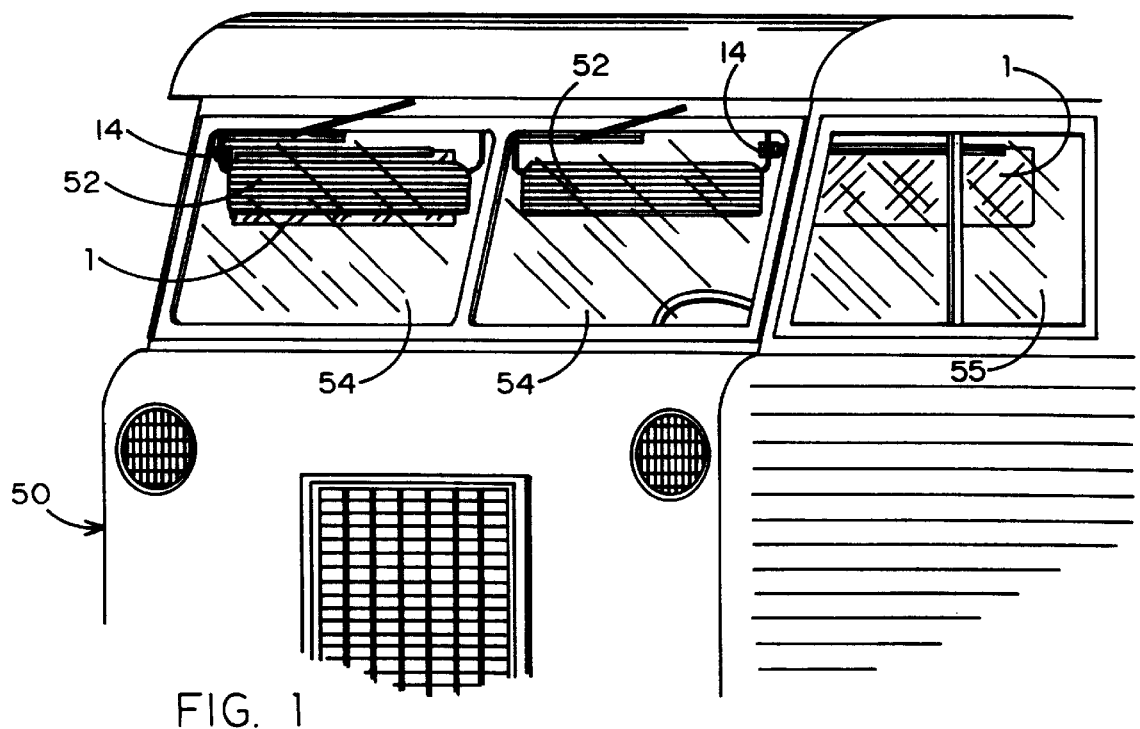
FIG. 1 shows a recreational vehicle (e.g. a motor home) having a pair of factory installed and auxiliary sun visors located at each of the driver and passenger compartments.

The auxiliary sun visor 1 which forms the present invention is now described while referring to the drawings. The auxiliary sun visor 1 has particular application for use in recreational vehicles, such as a Class A motor home, or the like, as represented by the reference numeral 50 in FIG. 1. In this regard, the auxiliary sun visor 1 is to be used in combination with but not in replacement of the existing factory installed sun visor 52 which is a stock item in the usual motor home 50. As will soon be explained, the auxiliary sun visor 1 is adapted to be rotated through a 90 degree arc from its at rest position (as shown in FIG. 2) located in face-to-face alignment with the existing sun visor 52 that is disposed behind the front window 54 of motor home 50 to a deployed position (as shown in FIG. 3) alongside the driver's (or the passenger's) side window 55.

As is best shown in FIG. 1 of the drawings, an auxiliary sun visor 1 is associated with each of the existing sun visors 52 which function in their usual manner to block sunshine and glare from passing through the front windows 54 at the driver and passenger compartments of the motor home 50. An auxiliary sun visor 1 may be deployed by either the driver or the passenger in the motor home 50 depending upon the position of the sun in the sky and the direction in which the motor home 50 is traveling relative to the sun.

Figure 2:
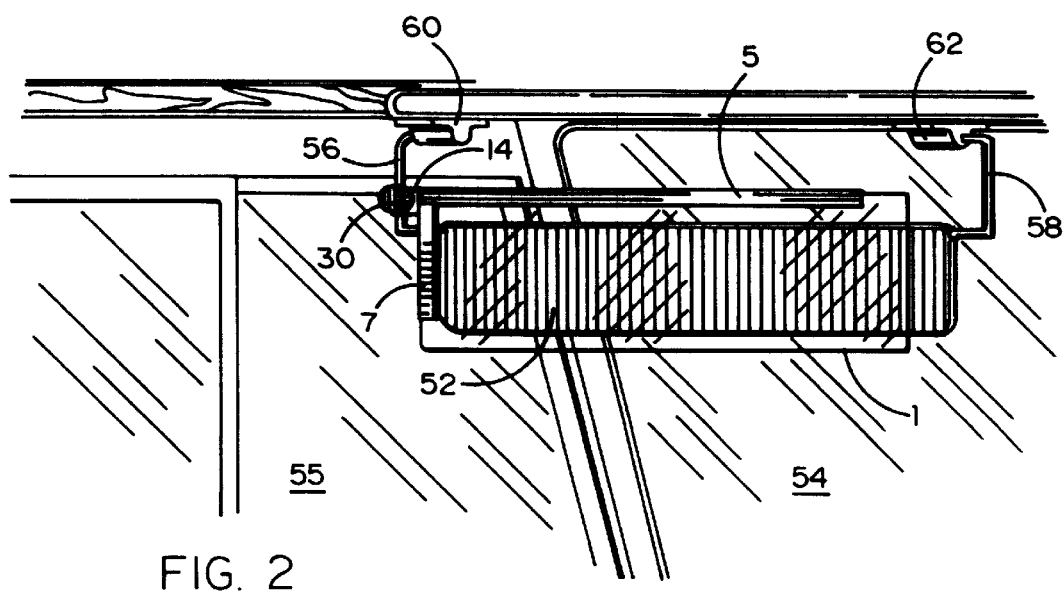
FIG. 2 shows a pair of the factory installed and auxiliary sun visors in the downward, sun blocking position at the driver compartment of the motor home.
Figure 3:
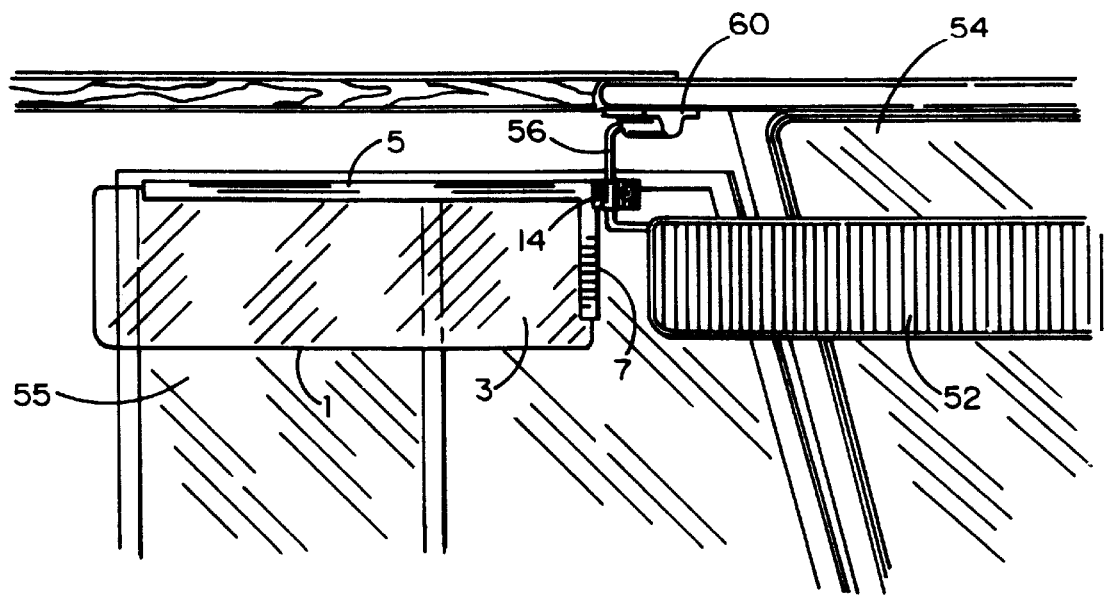
FIG. 3 shows the auxiliary sun visor rotated relative to the factory installed sun visor to a deployed position at which to block the transmission of sunlight through the side window of the driver compartment.

Referring to FIGS. 5–8 of the drawings, the details are now provided for manufacturing the auxiliary sun visor 1 as well as for coupling sun visor 1 to the existing sun visor 52 of motor home 50 shown in FIGS. 1–3. The auxiliary sun visor 1 includes a flat panel 3 that is formed from a transparent plastic material, such as that known commercially as Plexiglas. The panel 3 of sun visor 1 may be tinted or smoked to reduce glare and minimize the transmission of sunlight to the occupants of the motor home 50. A first channel member 5 receives the top edge of panel 3 therewithin, and a second channel member 7 receives a side edge of panel 3. Regardless of whether the auxiliary sun visor 1 is associated with the driver side or the passenger side of the motor home 50, the channel member 7 is attached to the edge of the panel 3 that will lie closest to the side window 55. Therefore, separate auxiliary sun visors 1 will be required for the driver and passenger compartments. By way of example, the auxiliary sun visor 1 shown in FIGS. 5–8 will be located at the driver side of motor home 50.

The first and second channel members 5 and 7 are respectively connected along the top and side edges of the panel 3 by means of threaded fasteners 10 which extend therethrough. A suitable tool (e.g. an Allan wrench) is used to mate the fasteners 10 to correspondingly threaded lugs 12 (best shown in FIG. 8) that are integrally formed at the bottoms of the channel members 5 and 7.

Figure 7:
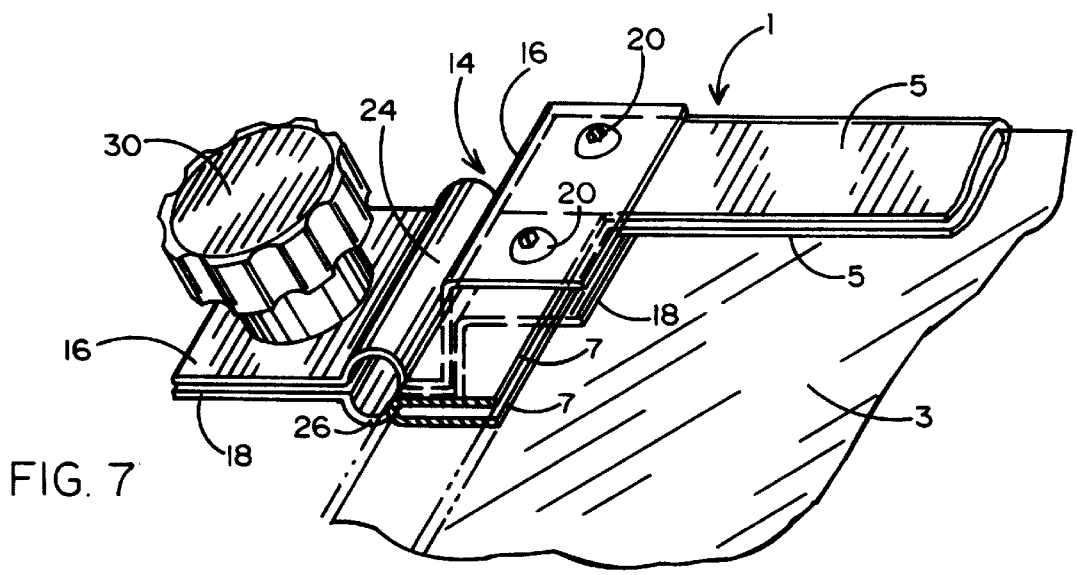
FIG. 7 shows a bracket by which the auxiliary sun visor is detachably coupled to the factory installed sun visor.
Figure 8:
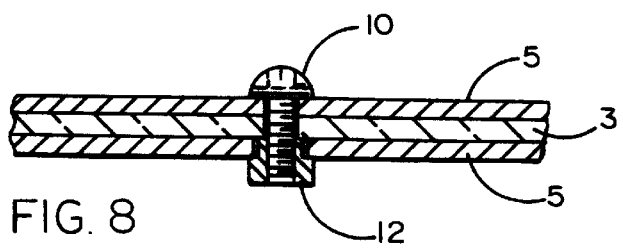
FIG. 8 is an enlarged detail taken from FIG. 6.

As an important feature of this invention, a bracket 14 is affixed to the auxiliary sun visor 1 at the intersection of the first and second channel members 5 and 7 running along the top and side edges of panel 3. As will be disclosed in greater detail hereinafter, the bracket 14 enables the auxiliary sun visor 1 to be detachably coupled to the existing hardware by which the factory installed sun visor 52 (of FIGS. 1–3) is attached to the motor home 50. As is best shown in FIG. 7, the bracket 14 includes a pair of general Z-shaped upper and lower plates 16 and 18. The corner of the auxiliary sun visor 1 at which the top and side channel members 5 and 7 intersect one another is sandwiched between first ends of the upper and lower plates 16 and 18 of the bracket 14. Threaded fasteners 20 which are identical to the previously mentioned fasteners 10 extend through the corner of the panel 3, the channel members 5 and 7, and the pair of upper and lower bracket plates 16 and 18 to be mated to correspondingly threaded lugs 22 that are integral to the lower bracket plate 18.

The opposite ends of the pair of upper and lower plates 16 and 18 of bracket 14 have arcuate clamping receptacles 24 and 26 formed therein and running laterally therealong. The clamping receptacles 24 and 26 extend outwardly from the upper and lower bracket plates 16 and 18 and in opposite directions relative to one another to receive an existing support arm (designated 56 in FIGS. 2 and 3) that is usually associated with each of the factory installed sun visors 52 of the motor home 50.

Figure 9:
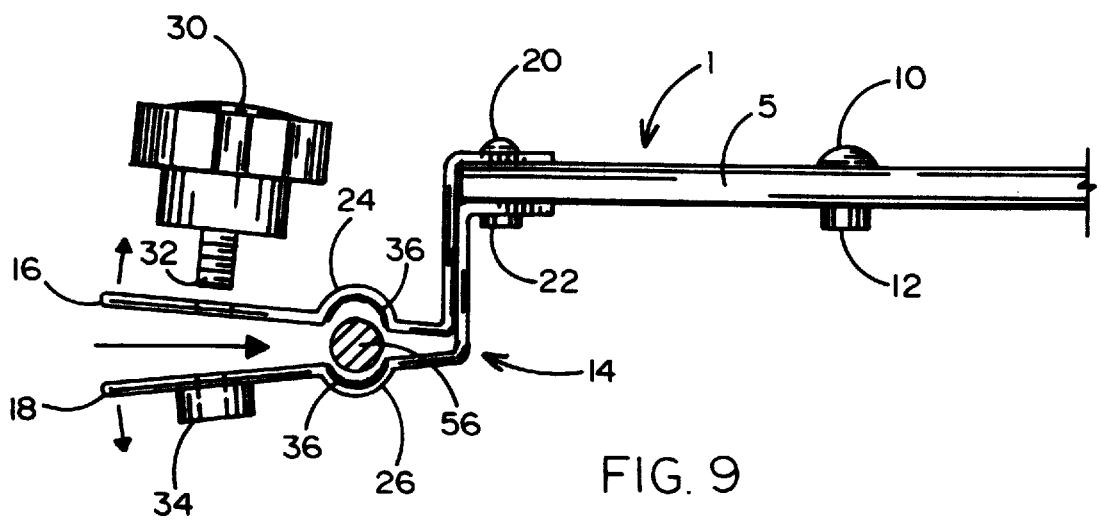
FIGS. 9 and 10 show the means by which the auxiliary sun visor is detachably coupled to the existing hardware of the factory installed sun visor.
Figure 10:
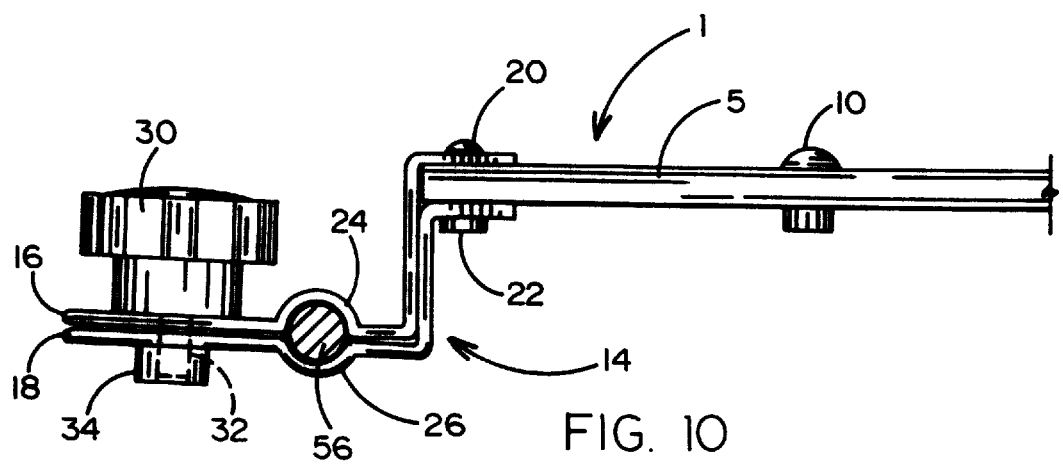

In order to secure the clamping receptacles 24 and 26 located at the upper and lower plates 16 and 18 of bracket 14 around the existing support arm 56, a rotatable locking knob 30 is removably connected to the upper bracket plate 16 behind the clamping receptacle 24 thereof. As is best shown in FIGS. 9 and 10, the locking knob 30 has a threaded shaft 32 that is sized to extend through the upper and lower bracket plates 16 and 18 to be mated to a correspondingly threaded lug 34 that is integral to the lower bracket plate 18.

Figure 4:
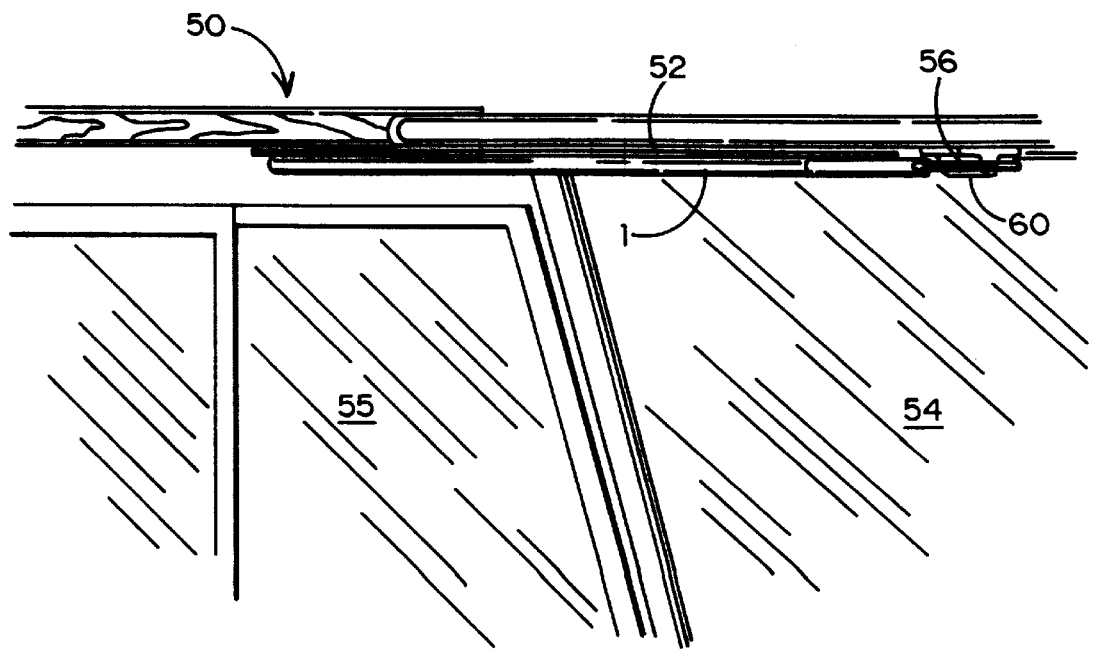
FIG. 4 shows the pair of factory installed and auxiliary sun visors at the driver compartment rotated to an upward, stowed away position.
Figure 5:
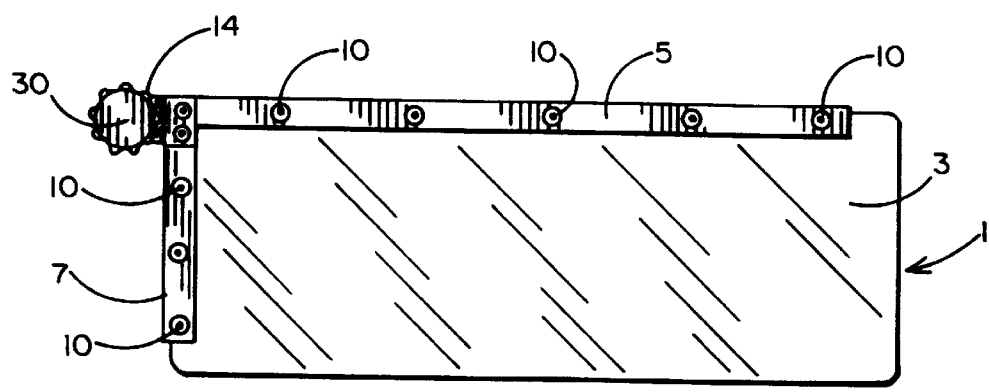
FIG. 5 is a front elevational view of the auxiliary sun visor which forms this invention.
Figure 6:
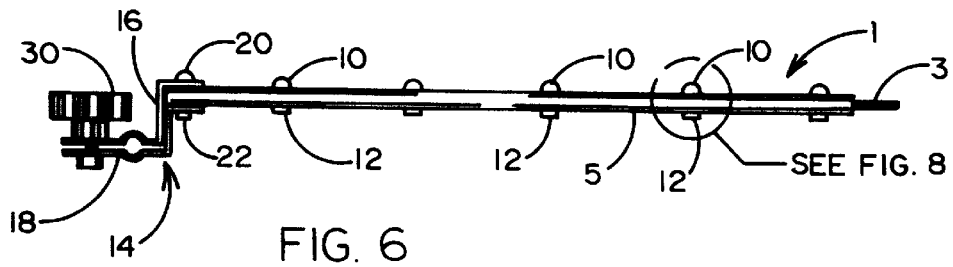
FIG. 6 is a top plan view of the auxiliary sun visor of FIG. 5.

Returning briefly to FIGS. 1–4 of the drawings, the existing, factory installed sun visors 52 are shown attached to the driver and passenger sides of motor home 50. As is best shown in FIG. 2, either a continuous support arm or a pair of existing axially aligned support arms 56 and 58 project from opposite ends of sun visor 52. The support arms 56 and 58 bend upwardly to be pivotally connected to respective terminals 60 and 62. Accordingly, the factory installed sun visors 52 of motor home 50 are suspended from support arms 56 and 58 and adapted to be rotated with their support arms 56 and 58 relative to terminals 60 and 62 from a downward at rest position (as shown in FIGS. 1–3) at which to block sunlight from passing through the front windows 54 to an upward, stowed away position (as shown in FIG. 4) above the front windows 54 when the use of the factory installed sun visors 52 is not required.

Referring concurrently now to FIGS. 1–4, 9 and 10 of the drawings, the auxiliary sun visor 1 of the present invention is shown detachably connected to one of the existing support arms (e.g. 56) that is also used to attach the factory installed sun visor 52 of motor home 50 to terminal 60. More particularly, with the front ends of the upper and lower plates 16 and 18 of bracket 14 affixed to panel 3 of auxiliary sun visor 1 and when the rotatable locking knob 30 is loosened or detached from the upper and lower plates 16 and 18 so that threaded shaft 32 thereof is removed from its threaded lug 34, the opposite ends of upper and lower bracket plates 16 and 18 can be i separated from one another (represented by the reference arrows of FIG. 9). At this point, the existing support arm 56 of the factory installed sun visor 52 can be located within the opposing clamping receptacles 24 and 26 of upper and lower bracket plates 16 and 18. To enhance the locking grip to be applied against the existing support arm 56, each of the clamping receptacles 24 and 26 may be covered with an optional rubber coating (designated 36 and best shown in FIG. 9) 20 such as that known commercially as Color Guard and distributed by Permatex International of Newington, Conn.

Once the support arm 56 from the existing sun visor 52 is seated within the opposing clamping receptacles 24 and 26 of bracket 14, the rotatable locking knob 30 is returned to the upper bracket support plate 16. The locking knob 30 is then rotated so that the threaded shaft 32 is advanced towards and into mating engagement with the threaded lug 34 of lower bracket support plate 18. It will be appreciated that the upper and lower support plates 16 and 18 of bracket 14 are now tightened together with the existing support arm 56 held between the clamping receptacles 24 and 26. The auxiliary sun visor 1 is now detachably coupled to the motor home 50 at the existing support arm 56 of factory installed sun visor 52. In this regard, the auxiliary sun visor 1 can also be easily removed from the motor home 1 by simply rotating the locking knob 30 is an opposite direction so as to loosen the clamping force applied by the clamping receptacles 24 and 26 of bracket 14 against existing support arm 56, whereby to permit the upper and lower support plates 16 and 18 to separate.

By virtue of the foregoing detachable connection of the auxiliary sun visor 1 to the existing support arm 56, the auxiliary sun visor 1 can be moved either with or independently of the factory installed sun visor 52. That is to say, because of the generally Z-shaped bracket 14, when its use is not required, the auxiliary sun visor 1 will be located immediately behind the factory installed sun visor 52 in face-to-face alignment therewith. Therefore, the auxiliary and factory installed sun visors 1 and 52 can be rotated in unison between the previously described downward and sunlight blocking position behind the front window 54 of motor home 50 (as shown in FIG. 2) to the upward, stowed away position above the front window 54 (as shown in FIG. 4). However, when its deployment is required to block the transmission of sunlight or glare through a side window 55 of motor home 50, the locking knob 30 is first rotated and loosened to momentarily reduce the clamping force generated by clamping receptacles 24 and 26 so as to permit the auxiliary sun visor 1 to be rotated through an arc of 90 degrees around the existing support arm 56 to which sun visor 1 is detachably coupled. In this case, the auxiliary sun visor 1 is moved relative to the factory installed sun visor 52 so as to lie against the side window 55 (as shown in FIG. 3) at which time the locking knob 30 is once again tightened. Accordingly, the driver and/or the passenger within motor home 50 will have the advantage of being able to comfortably shade his eyes from sunlight passing through one or both of the front and side windows 54 and 55. When its use is no longer needed, the auxiliary sun visor 1 is simply rotated away from side window 55 and back to its initial position behind the factory installed sun visor 52.

I claim:

1. In combination:
   a first sun visor for use in a motor vehicle having a front and a side window, said first sun visor having a support arm by which said first sun visor is attached to the motor vehicle so as to be disposed at a location behind the front window of the motor vehicle; and
   an auxiliary sun visor coupled to the first sun visor and adapted to be moved relative to the first sun visor from the location behind the front window to a new location adjacent the side window of the motor vehicle, whereby said first and auxiliary sun visors cooperate to shield occupants of the motor vehicle from the transmission of sunlight through the front and side windows, said auxiliary sun visor including:
   a partially transparent panel to reduce the transmission of sunlight entering the motor vehicle through the side window thereof;
   a bracket by which said transparent panel is detachably coupled to the first sun visor, said bracket having first and second plates and respective clamping receptacles formed in said first and second plates and oppositely aligned with one another to receive therewithin the support arm of the first sun visor, said transparent panel being positioned between said first and second plates at a first end of said bracket;
   a fastener located through the first and second plates of said bracket to hold said partially transparent panel between said first and second plates at the first end of said bracket; and
   a rotatable locking knob having a threaded shaft extending through said first and second plates at the opposite end of said bracket, said locking knob being rotated in a first direction by which to cause said first and second plates to be tightened together to thereby apply a clamping pressure against the support arm of the first sun visor within said oppositely aligned clamping receptacles, and said locking knob being rotated in an opposite direction by which to cause said first and second plates to be moved apart to thereby reduce the clamping pressure against the support arm so that said support arm can be removed from said oppositely aligned clamping receptacles to permit said auxiliary sun visor to be detached from the first sun visor.

2. The combination recited in claim 1 wherein said auxiliary sun visor is rotatable around the support arm of the first sun visor through an arc of 90 degrees so as to be positioned behind the side window of the motor vehicle when said locking knob is first rotated in said opposite direction to thereby reduce the clamping pressure against the support arm received in the oppositely aligned clamping receptacles of the first and second plates of said bracket.

* * * * *